(12) United States Patent
Yamada et al.

(10) Patent No.: US 7,579,745 B2
(45) Date of Patent: Aug. 25, 2009

(54) MOTOR

(75) Inventors: Kensuke Yamada, Tachikawa (JP); Yuuki Takahashi, Tama (JP); Masami Ito, Hachioji (JP); Takeo Miyajima, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 279 days.

(21) Appl. No.: 11/312,481

(22) Filed: Dec. 21, 2005

(65) Prior Publication Data
US 2006/0192454 A1 Aug. 31, 2006

(30) Foreign Application Priority Data
Feb. 25, 2005 (JP) ............................ P2005-050353

(51) Int. Cl.
*H02K 23/04* (2006.01)
*H02K 1/00* (2006.01)

(52) U.S. Cl. ............. 310/269; 310/154.21; 310/154.22; 310/46; 310/154.01; 29/596

(58) Field of Classification Search ............ 310/154.21, 310/154, 216, 46, 154.01, 152, 154.22, 40 MM, 310/154.15, 154.03, 269; 29/596
See application file for complete search history.

(56) References Cited

U.S. PATENT DOCUMENTS

| | | | | |
|---|---|---|---|---|
| 4,881,002 A * | 11/1989 | Yamaguchi | ................. | 310/261 |
| 5,201,111 A * | 4/1993 | Prohaska | .................... | 29/596 |
| 5,250,866 A * | 10/1993 | Fukui et al. | ............ | 310/154.14 |
| 5,473,210 A * | 12/1995 | Someya et al. | ......... | 310/154.19 |
| 5,959,386 A * | 9/1999 | Knight | .................. | 310/154.14 |
| 6,060,799 A * | 5/2000 | McManus et al. | ............. | 310/43 |
| 6,175,176 B1 * | 1/2001 | Vogler | .................. | 310/156.16 |
| 6,316,850 B1 * | 11/2001 | Nakamura | ............ | 310/40 MM |
| 6,568,066 B2 * | 5/2003 | Furuya et al. | .................. | 29/598 |
| 6,873,077 B2 * | 3/2005 | Jurisch | .................. | 310/156.01 |
| 2002/0047381 A1 * | 4/2002 | Torii et al. | ..................... | 310/89 |

FOREIGN PATENT DOCUMENTS

JP 11-341722 12/1999

OTHER PUBLICATIONS ("Finite element analysis on torque fluctuation of PMDC motors induced by cogging and commutation", Ruifang Liu; Dengjun Yan; Minqiang Hu; Electrical Machines and Systems, 2003. ICEMS 2003. Sixth International Conference on, vol. 2, Nov. 9-11, 2003 pp. 747-750 vol. 2.*

* cited by examiner

*Primary Examiner*—Quyen Leung
*Assistant Examiner*—John K Kim
(74) *Attorney, Agent, or Firm*—Whitham Curtis Christofferson & Cook, P.C.

(57) ABSTRACT

A rotor is operable to rotate in a rotating direction, and is provided with five teeth that define five slots therebetween at regular intervals in the rotating direction. A pair of arc-shaped magnets surrounds the rotor, and faces each other through the rotor. A value of a circumferential angle between two adjacent slots with respect to an axis of the rotor is defined as a. A value of a circumferential angle between opposite end edges of an inner surface of the magnet in a circumferential direction of the magnet, which faces the rotor, with respect to the axis of the rotor is defined as b. The value of b falls within a range from 23 to 25 when the value of a is assumed as 12.

3 Claims, 4 Drawing Sheets

MOTOR

BACKGROUND OF THE INVENTION

This invention relates to a motor, and more particularly to a motor with a rotor having five slots located inside of two magnets.

A related motor is shown in FIG. 6. A motor 1 as shown is schematically constructed of a motor case 2, two arc-shaped magnets 3 arranged so as to face each other within the motor case 2, a spring 4 for pressing to fix the two magnets 3 to projections of the motor case 2 and a rotor (motor core) 5 arranged inside the two magnets 3. The rotor 5 has five slots 6 which are arranged at regular intervals in a rotating direction.

The motor 1, as shown in FIG. 6, is designed so that the circumferential angle for the inner peripheral portion of one of the arc-shaped magnets 3 when viewed from a rotating center C according to the center of the motor case 2, i.e. the magnet inner circumferential angle θ is 135° (for example, JP-A-11-341722).

Since the above two-pole five slot motor 1 is designed to provide the magnet inner circumferential angle of 135, the magnetic flux density greatly varies at opposite ends in the circumferential direction of the magnet 3. As a result, a cogging torque which leads to the irregular rotation of the motor 1 is increased. This is a serious problem from the standpoint of view of assuring the accuracy of driving control and rotation driving of the motor 1.

SUMMARY OF THE INVENTION

It is therefore an object of the invention to provide a motor in which the cogging torque leading to the irregular rotation of the motor is reduced.

In order to achieve the object, according to the invention, there is provided a motor comprising:

a rotor, operable to rotate in a rotating direction, and provided with five teeth that define five slots therebetween at regular intervals in the rotating direction; and a pair of arc-shaped magnets, surrounding the rotor, and facing each other through the rotor, wherein a value of a circumferential angle between two adjacent slots with respect to an axis of the rotor is defined as a, a value of a circumferential angle between opposite end edges of an inner surface of the magnet in a circumferential direction of the magnet, which faces the rotor, with respect to the axis of the rotor is defined as b, and the value of b falls within a range from 23 to 25 when the value of a is assumed as 12.

The value of b may be 24.

With this configuration, as long as the ratio between the circumferential angle for each slot (hereinafter referred to as a slot opening angle) a° and the circumferential angle for the inner surface of each magnet (hereinafter referred to as a magnet inner circumferential angle) b° is within a range of a:b=12:23 to 25, the magnetic flux density at opposite ends of the magnet on the stator side varies gently.

Now, if the ratio between the slot opening angle a° and the magnet inner circumferential angle b° becomes below the above range, since the magnet flux density at opposite ends of the magnet varies greatly, the cogging torque is deteriorated. On the other hand, if the ratio exceeds the above range, the distribution of the magnetic field is adversely affected, thereby attenuating the motor efficiency. For this reason, the ratio between the slot opening angle a° and the magnet inner circumferential angle b° is set at a:b=12:23 to 25, preferably, a:b=12:24.

A value of a circumferential angle between opposite end edges of an outer surface of the magnet in the circumferential direction of the magnet, which is opposed to the inner surface, with respect to the axis of the rotor is defined as c, and the value of c may fall within a range from 20 to 22.5.

In this case, if the ratio between the above slot opening angle a° and the circumferential angle for the outer peripheral portion of each magnet (hereinafter referred to as a magnet outer peripheral angle) c° is within a range of a:c=12:20 to 22.5, the magnetic flux density at opposite ends of the magnet varies more gently than the related motor.

The value of c may be 20.

In this case, if the ratio among the slot opening angle a°, magnet inner circumferential angle b° and magnet outer peripheral angle c° is set at a:b:c=3:6:5, the magnetic flux density at opposite ends of the magnet varies further gently so that the effect of reducing the cogging torque can be shown most remarkably.

A value of a circumferential angle between opposite end edges of an outer surface of the magnet in the circumferential direction of the magnet, which is opposed to the inner surface, with respect to the axis of the rotor is defined as c, and b>c is satisfied.

Opposite end surfaces of the magnet in the circumferential direction may be slopingly connected to the end edges of the inner surface and the end edges of the outer surface.

In this case, since opposite end surfaces of the magnet slope toward the central portion of the magnet as they go outwardly in a radial direction of the rotor, the magnetic flux density varies further gently on the inner side and outer side at opposite ends of the magnet.

DETAIL DESCRIPTION OF PREFERRED EMBODIMENTS

Now referring to FIGS. 1 and 5, an explanation will be given of an embodiment of this invention. In order to reduce the cogging torque of the two-pole five-slot motor to minimize the irregular rotation, a slot opening angle a°, a magnet inner circumferential angle b° and a magnet outer peripheral angle c° are set within the range of 12:23 to 25:20 to 22.5 and opposite end surfaces of the arc-shape magnet slopes toward the central portion of the arc-shaped magnet as they go outwardly in a radial direction of the rotor.

Figure 1:
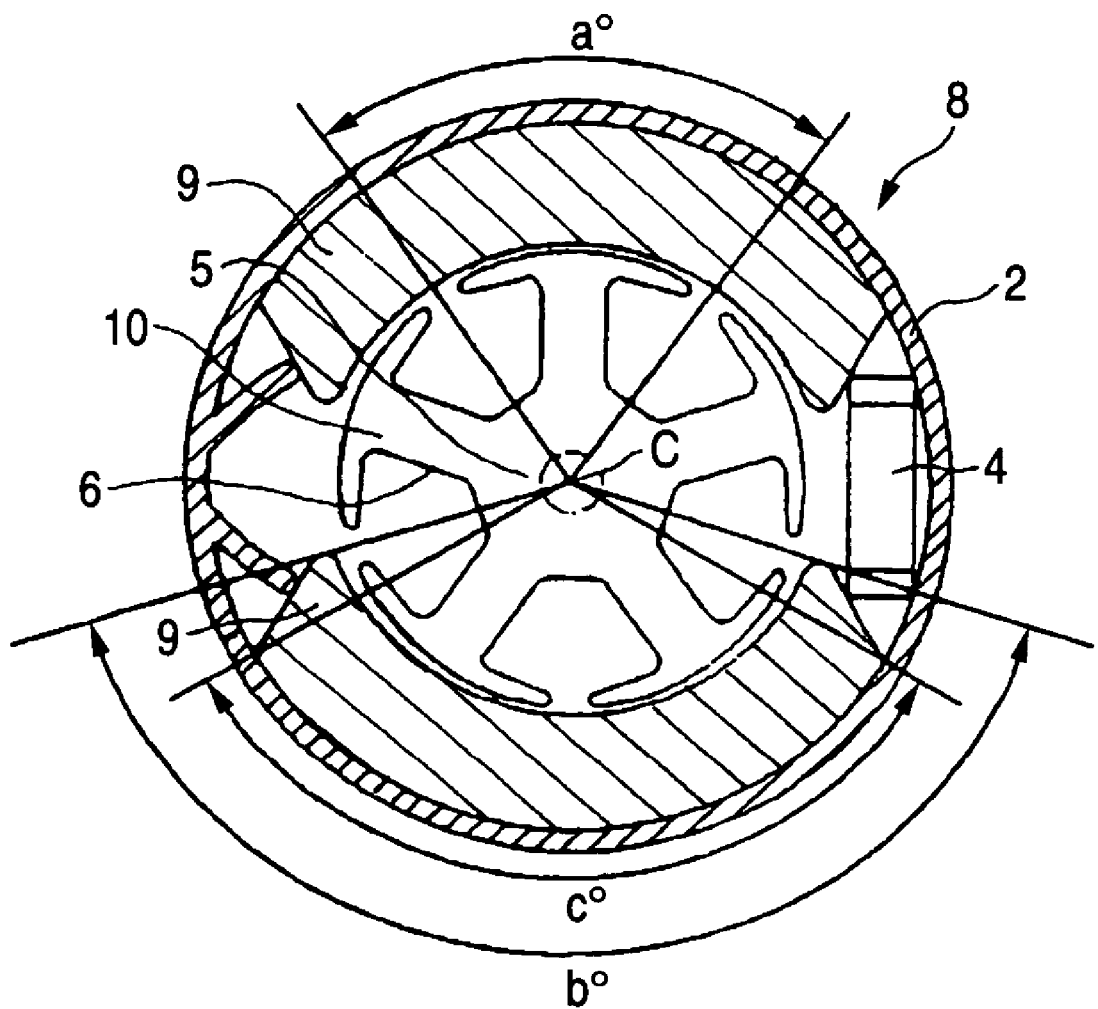
FIG. 1 is a sectional view of a motor according to this embodiment of this invention.

In FIG. 1, projections (not shown) are provided at two spots of a stator side motor case 2 of the motor (two-pole five-slot motor) 8. The rear concave portion of each of two arc-shaped magnets 9 is fit in each projection. The arc-shaped magnet 9 is pressed to fix to the inner wall of the motor case 2 by a spring 4. Thus, the two magnets 9 are arranged so as to face each other inside the motor case 2.

Further, a rotor (motor core) 5 is arranged inside each of the two arc-shaped magnets 9. The rotor 5 has five teeth 10 having T shape in section. These five teeth 10 extend in a radial direction from an axial center C of the rotor 5. The tip of each tooth 10 is adjacent to the inner periphery of the two magnets 9. Further, slots 6 are formed at five spots between the adjacent teeth 10 of the rotor 5. These slots are arranged at regular intervals in the rotating direction of the rotor 5.

As shown in FIG. 1, the slot opening angle a°, the magnet inner circumferential angle b° and the magnet outer peripheral angle c° are set so as to satisfy a predetermined magnitude relationship to one another when viewed from the center of the motor case 2.

Now, all the angles a°, b° and c° are circumferential angles with respect to the center of the motor case 2, i.e. the axial center C of the rotor 5. The circumferential angle for a single slot 6, i.e. the angle a° from a certain slot 6 to an adjacent slot 6 is referred to as the slot opening angle, the circumferential angle b° for the portion of the magnet 9 on the inner peripheral side (slot 6 side) facing the rotor 5 is referred to as the magnet inner circumferential angle, and the circumferential angle c° for the portion of the magnet 9 on the outer peripheral side abutting to the motor case 2 is referred to as the magnet outer peripheral angle. In this case, the slot opening angle a°, the magnet inner circumferential angle b° and the magnet outer peripheral angle c° satisfy the relationship of a°:b°:c°=3:6:5=12:24:20.

Figure 6:
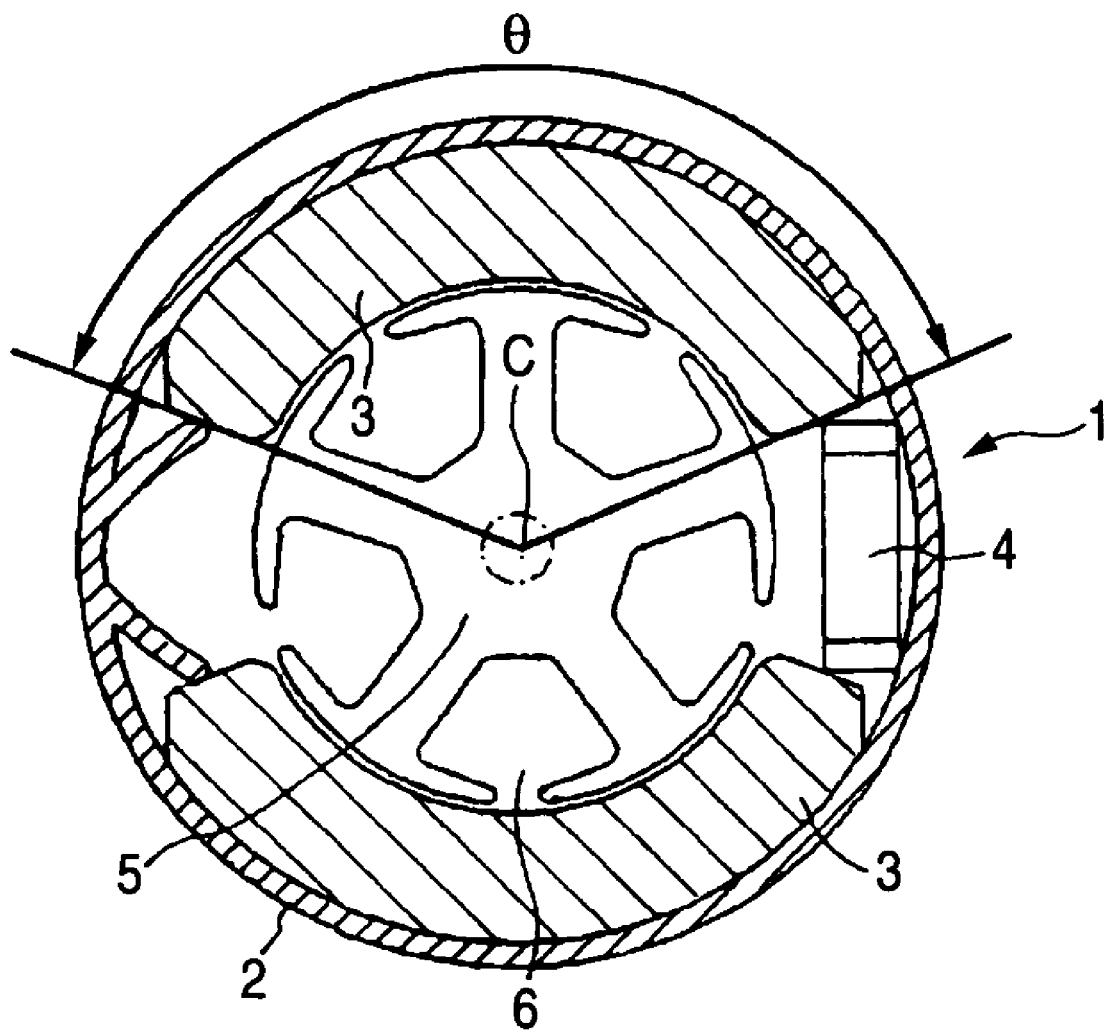
FIG. 6 is a sectional view of a typical structure of a related motor.

The above two-pole five-slot motor 8, in which the slot opening angle a°, the magnet inner circumferential angle b° and the magnet outer peripheral angle c° are set to satisfy the relationship of a°:b°:c°=12:24:20, could reduce the cogging torque as compared with the related motor (see FIG. 6). This may be because at opposite ends of the arc-shaped magnet 9, the magnetic flux density generated between the magnet 9 and rotor 5 varies more gently than in the related motor 1.

Figure 2:
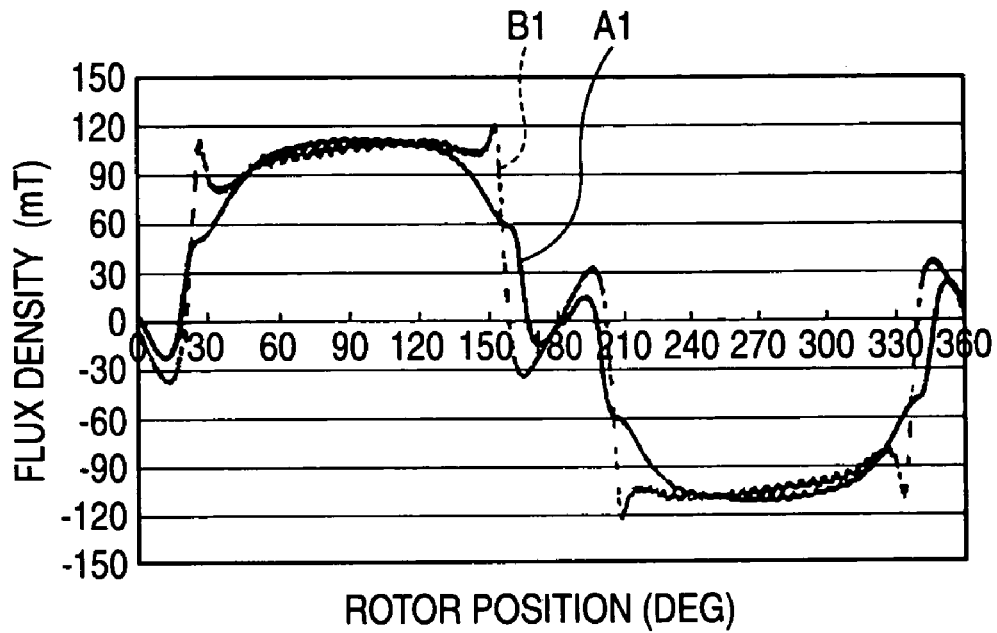
FIG. 2 is a magnetic flux waveform characteristic view to comparatively explain the performances of the motor according to this invention and a related motor.

As shown in FIG. 2, the magnetizing waveform curve B1 of the related motor 1 exhibits the magnetic flux density varying abruptly at opposite ends of the magnet.

On the other hand, the magnetizing waveform curve Al of the motor 8 according to the invention exhibits the magnetic flux density varying gently at opposite ends of the magnet. As a result, the cogging torque which leads to the irregular rotation of the motor 8 could be reduced. Accordingly, the motor 8 according to the invention permitted the motor driving control to be carried out exactly and the motor rotation driving to be carried out precisely.

Figure 3:
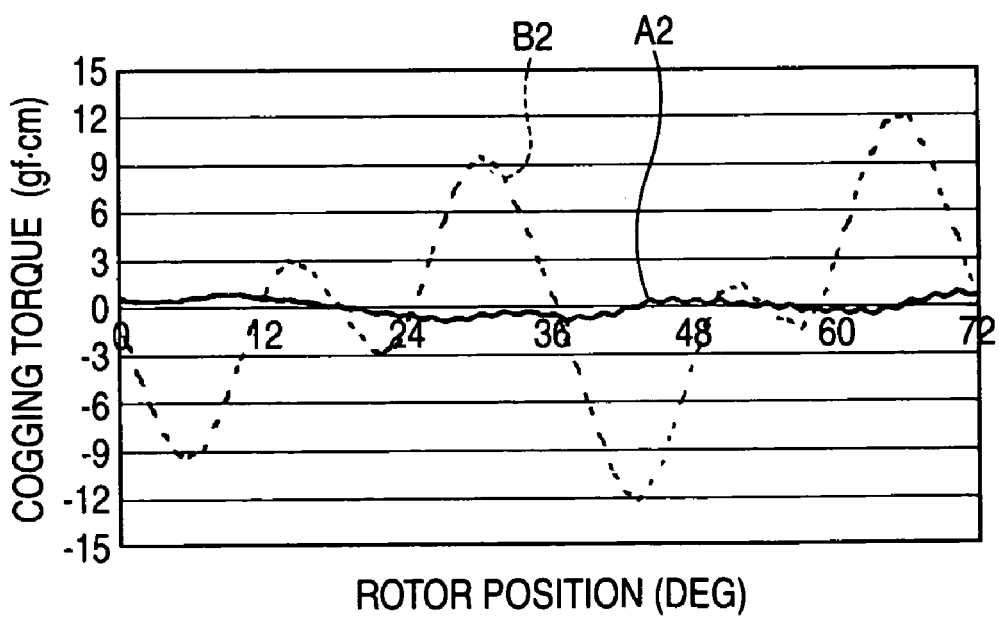
FIG. 3 is a characteristic view of the cogging torque to comparatively explain the performances of the motor according to this invention and a related motor.

The motor performance experiment (as shown in FIG. 3) was carried out assuming that the slot opening angle a° (θ°) is equal to 72°. In addition, in the related motor 1, the magnet inner circumferential angle was set at 135°, whereas in the motor 8 according to the invention, the magnet inner circumferential angle b° was set at 144° and the magnet outer peripheral angle c° was set at 120°.

As shown in FIG. 3, the cogging torque waveform curve B2 of the related motor 1 exhibits the cogging torque greatly varying according to the rotating position of the rotor 5 and amplitude width (difference between the maximum value and the minimum value) of the cogging torque which greatly varies over the entire range of the rotation position of the rotor 5.

On the other hand, the cogging torque waveform curve A2 of the motor 8 according to the invention exhibits the cogging torque which does not almost vary according to the rotating position of the rotor 5 and amplitude width (difference between the maximum value and the minimum value) of the cogging torque which is substantially constant over the entire range of the rotation position of the rotor 5. Concretely, in accordance with the invention, the cogging torque could be drastically reduced from 24.0 [gf·cm] in the related motor to 1.9 [gf·cm]. This is a preferable result of the reduction degree of 92%.

As described above, the cogging torque could be reduced and hence the irregular rotation of the motor 8 could be reduced. Thus, as compared with the related motor, this invention permits the motor driving control to be carried out exactly and the motor rotation driving to be carried out precisely.

In this invention, the magnet inner circumferential angle b° should not be limited to the magnitude in this embodiment. In this embodiment, the ratio between the slot opening angle a° and the magnet inner circumferential angle b° was set at a:b=3:6=12:24. However, according to the experiments, as long as the ratio is within a range of a:b=12:23 to a:b=12:25, the effect of improving the cogging torque peculiar to the invention can be obtained surely.

Figure 4:
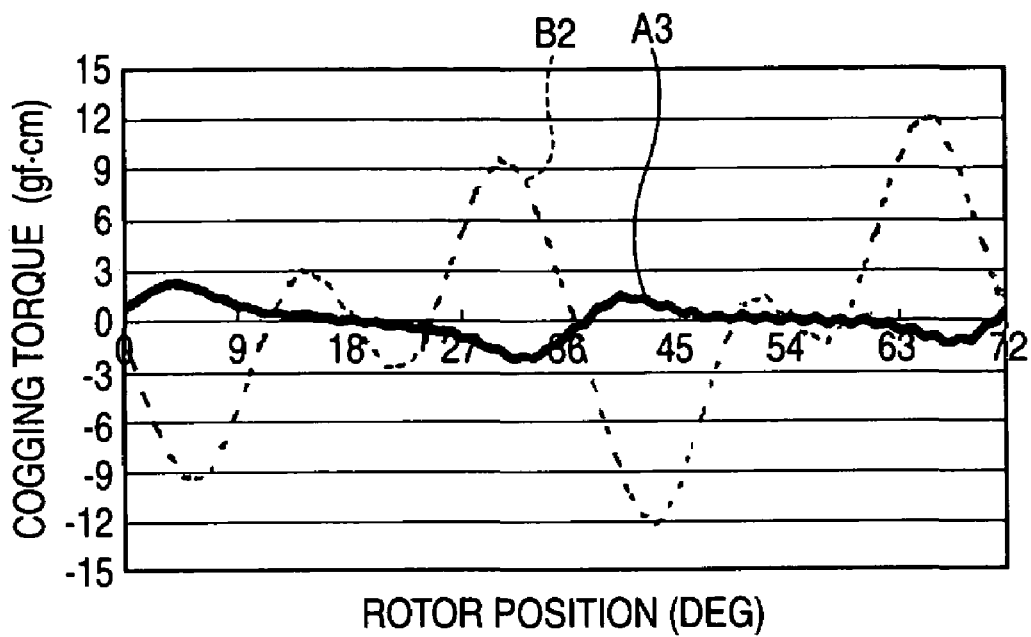
FIG. 4 is a characteristic view of the cogging torque to comparatively explain the performances of the motor according to this invention in which the magnet inner circumferential angle is different from the case of FIG. 3, and a related motor.

FIG. 4 is a characteristic view showing another experimental result. Although this experiment is different from the case in FIG. 3 in that the magnet inner circumferential angle b° was set at 140° to 148°, like the above case, the waveform curve A3 according to the invention exhibits the cogging torque reduced from 24.0 [gf·cm] to about 2.8 [gf·cm] as compared with the waveform curve B2. Namely, in this case also, the cogging torque was drastically reduced.

Further, the magnet outer peripheral angle c° in the motor 8 according to the invention should not also be limited to the magnitude in the above embodiment. In the above embodiment, although the magnitude of the magnet outer peripheral angle c° relative to the slot opening angle a° was set with the ratio of a:c=3:5=24:40, the effect of improving the cogging toque peculiar to the invention can be surely obtained as long as the ratio is set within a range from a:c=24:40 to a:c=24:45.

Figure 5:
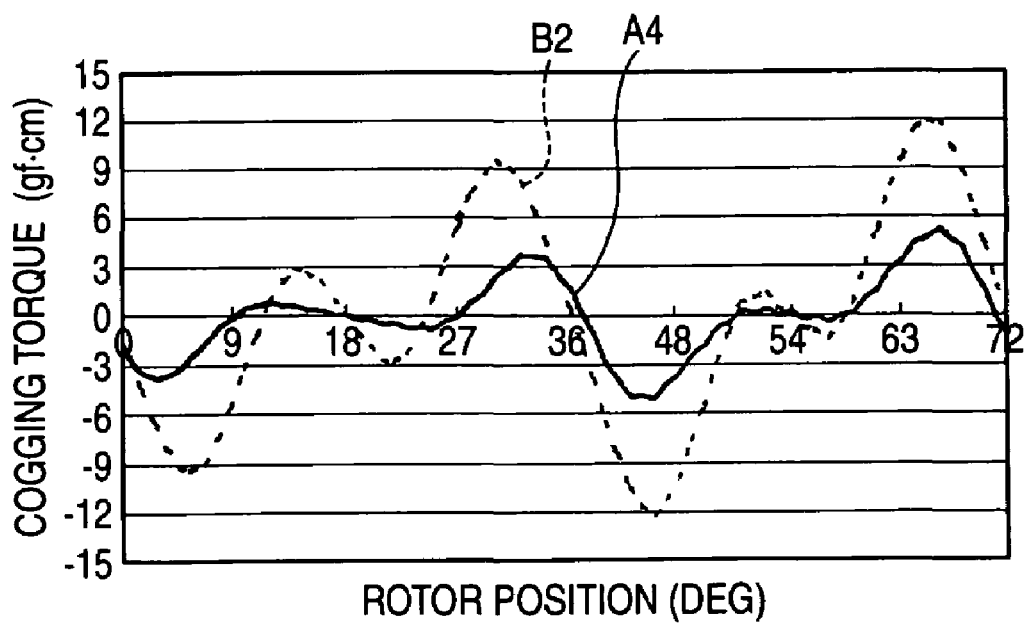
FIG. 5 is a characteristic view of the cogging torque to comparatively explain the performances of the motor according to this invention in which the magnet inner circumferential angle is different from the case of FIG. 3, and a related motor.

FIG. 5 is a characteristic view showing a still another experimental result. Although this experiment is different from the case in FIG. 3 in that the magnet outer circumferential angle c° was set at 134.5°, like the above case, the waveform curve A4 according to the invention exhibits the cogging torque reduced from 24.0 [gf·cm] to about 6.5 [gf·cm] as compared with the waveform curve B2. Namely, in this case also, the cogging torque was greatly reduced.

As described above, it is preferable to set the ratio among the slot opening angle a°, the magnet inner circumferential angle b° and the magnet outer peripheral angle c° at the basic ratio of a°:b°:c°=3:6:5=24:48:40. However, also when it is set within the range of a:b=24:46 to 50, and also a:c=24:40 to 45, the magnetic flux density between opposite ends of the arc-shaped magnet 9 and the rotor 5 varies much gently than in the related motor. Thus, the cogging toque was greatly reduced to attenuate the irregular rotation so that the exact and accurate control of the rotation driving of the motor could be realized. Incidentally, in accordance with an experiment, in the ratio except the range of a:b:c=24:46:40 to a:b:c=24:50:45, the effect of improving the cogging torque peculiar to this invention could not be obtained.

Additionally, it is needless to say that this invention can be modified within a scope not departing from the sprit of this invention, and includes these modifications.

What is claimed is:

1. A motor comprising:
   a motor case;
   a rotor, operable to rotate in a rotating direction on a central axis within the motor case, and provided with five teeth that define five respective slots therebetween at regular intervals in the rotating direction; and
   a pair of arc-shaped magnets, surrounding the rotor, and facing each other through the rotor,
   wherein each of the magnets has an inner circumferential surface which faces the rotor, an outer circumferential surface which faces an inner wall of the motor case, and end surfaces which connect the inner circumferential surface and the outer circumferential surface;
   wherein a value of a circumferential angle between any two adjacent slots with respect to the central axis of the rotor is defined as the angle a,
   wherein a value of a circumferential angle between the inner circumferential surface with respect to the central axis of the rotor is defined as the angle b,
   wherein a value of a circumferential angle between the outer circumferential surface with respect to the central axis of the rotor is defined as angle c,
   wherein the ratio of the angle a: the angle b: the angle c is 3:6:5, and
   wherein a value of a circumferential angle between the end surfaces with respect to the central axis of the rotor becomes smaller from the angle b to the angle c as the distance from a center of the rotor becomes larger.

2. The motor according to claim 1 where the relationship of a:b:c=3:6:5=12:24:20.

3. The motor according to claim 2 where angle a is equal to 72°, angle b is equal to 144°, and angle c is equal to 120°.

* * * * *